United States Patent
Yokoura et al.

(10) Patent No.: US 8,816,640 B2
(45) Date of Patent: Aug. 26, 2014

(54) BATTERY CONTROL SYSTEM AND BATTERY CONTROL METHOD

(75) Inventors: Kouichi Yokoura, Kawasaki (JP); Motoo Futami, Hitachiota (JP); Kenji Takeda, Mito (JP); Shin Yamauchi, Mito (JP); Takeshi Uchida, Kasukabe (JP)

(73) Assignee: Hitachi, Ltd., Tokyo (JP)

( * ) Notice: Subject to any disclaimer, the term of this patent is extended or adjusted under 35 U.S.C. 154(b) by 357 days.

(21) Appl. No.: 13/408,017

(22) Filed: Feb. 29, 2012

(65) Prior Publication Data

US 2012/0223678 A1 Sep. 6, 2012

(30) Foreign Application Priority Data

Mar. 1, 2011 (JP) ................................ 2011-044039

(51) Int. Cl.
*H02J 7/00* (2006.01)
(52) U.S. Cl.
USPC ............................ 320/128; 320/107; 320/116
(58) Field of Classification Search
CPC .............................. H02J 7/0042; H02J 7/0068
USPC ................................................ 320/107, 128
See application file for complete search history.

(56) References Cited

U.S. PATENT DOCUMENTS

| 2007/0090793 | A1  | 4/2007 | Eguchi et al. |         |
|--------------|-----|--------|---------------|---------|
| 2009/0102424 | A1* | 4/2009 | Tien et al.   | 320/124 |
| 2009/0146610 | A1  | 6/2009 | Trigiani      |         |
| 2010/0244770 | A1* | 9/2010 | Yasuhito et al. | 320/121 |
| 2011/0175574 | A1* | 7/2011 | Sim et al.    | 320/121 |

FOREIGN PATENT DOCUMENTS

| EP | 2 149 958 A2  | 2/2010  |
|----|---------------|---------|
| JP | 2000-358330 A | 12/2000 |

OTHER PUBLICATIONS

European Search Report dated May 25, 2012 (five (5) pages).

* cited by examiner

*Primary Examiner* — Drew A Dunn
*Assistant Examiner* — Nathaniel Pelton
(74) *Attorney, Agent, or Firm* — Crowell & Moring LLP (57) ABSTRACT

When detecting a fault of a master control device, a slave control device refers to master-device-line information, and obtains line information to establish a connection with the other master control device. The slave control device transmits connection request information to the master control device extracted from the other master control devices. The other master control device determines whether or not it is connectable with the slave control device that has transmitted the connection request information, and transmits a determination result as connectability information. The slave control device switches a communication line to the other master control device when the received connectability information indicates the connectable status.

6 Claims, 8 Drawing Sheets

FIG.2

CONNECTION (FOUR SERIES AND TWO PARALLEL)
OF ELECTRIC SYSTEM OF BATTERY MODULE

FIG.3

CONNECTION (EIGHT SERIES)
OF ELECTRIC SYSTEM OF BATTERY MODULE

300 STRING INFORMATION

| 301 MASTER-DEVICE ID | 302 STRING ID | 303 SLAVE-DEVICE ID |
|---|---|---|
| A | A-1 | A-1-1 |
| A | A-1 | A-1-2 |
| A | A-1 | A-1-3 |
| A | A-1 | A-1-4 |

FIG.6B

300 STRING INFORMATION

| 301 MASTER-DEVICE ID | 302 STRING ID | 303 SLAVE-DEVICE ID |
|---|---|---|
| A | A-2 | A-2-5 |
| A | A-2 | A-2-6 |
| A | A-2 | A-2-7 |
| A | A-2 | A-2-8 |

BATTERY CONTROL SYSTEM AND BATTERY CONTROL METHOD

CROSS REFERENCE TO RELATED APPLICATION

The present application claims benefit of the filing date of Japanese Patent Application No. 2011-044039 filed on Mar. 1, 2011 which is incorporated herein by reference.

BACKGROUND OF THE INVENTION

1. Field of the Invention

The present invention relates to a battery control system and a battery control method which dispose, as a hierarchical structure, control devices that control batteries.

2. Description of the Related Art

Figure 9:
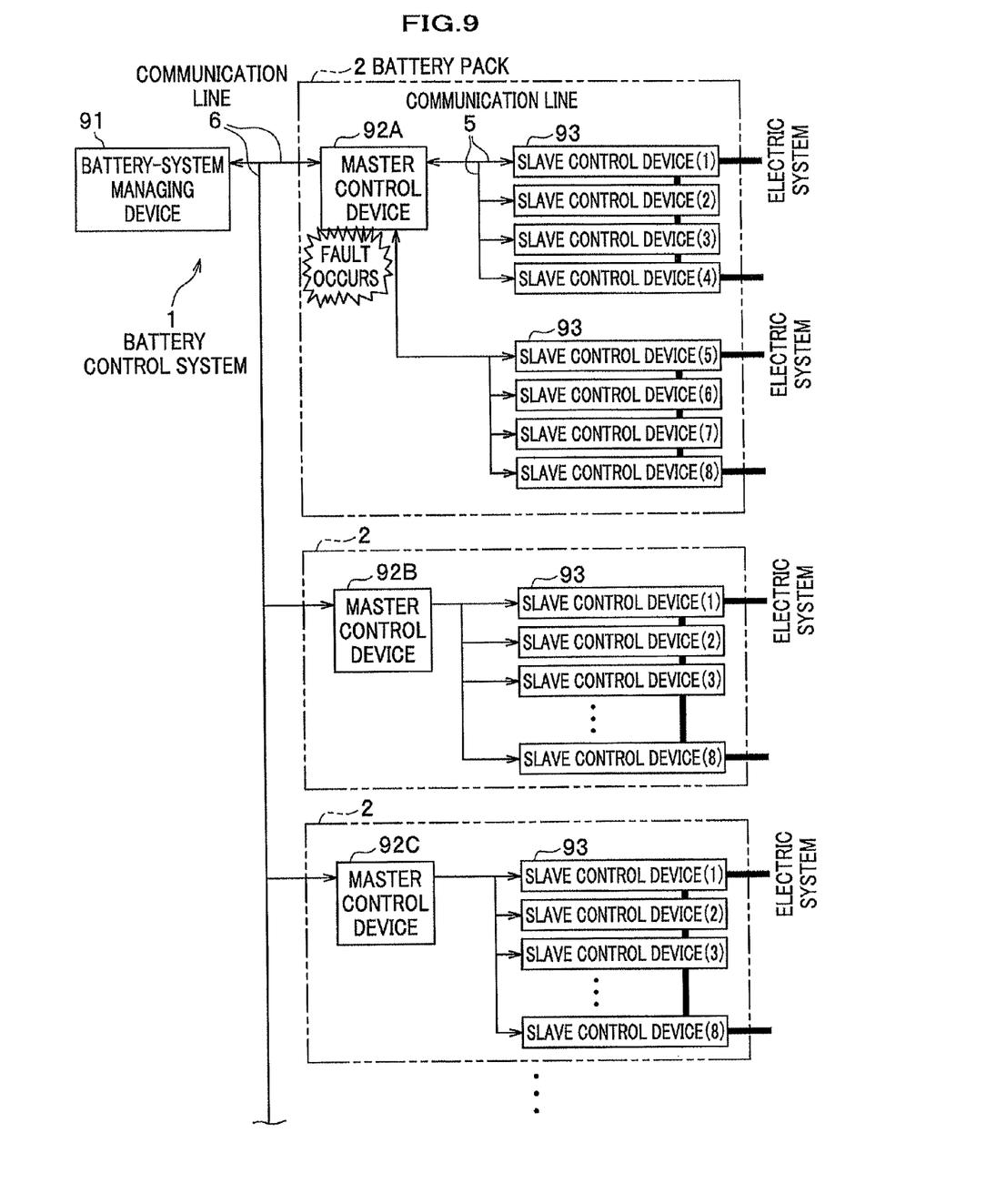
FIG. 9 is a diagram for explaining a process outline of a battery control system according to a prior art.

A technology of charging a battery with power generated by utilizing natural energy and with power from a system is getting attention. A battery control system realized by such a technology has, as shown in FIG. 9, slave control devices 93 controlling a battery and connected in series or in parallel as a group, and a master control device 92 comprehensively controls such a group of the slave control devices 93. Moreover, a whole group of the plurality of master control devices 92 is managed by a battery-system managing device 91, and thus a large-capacity battery is realized. In the battery control system having master and slave control systems as a hierarchical structure, the battery-system managing device 91 transmits a control signal to instruct charging, discharging, etc., of the battery to each slave control device 93 through the master control device 92, and manages a status of a communication line for transmitting/receiving the control signal and the operation status of the control device itself (see JP 2000-358330 A).

According to the conventional battery control system shown in FIG. 9, however, when the master control device 92 suffers a fault like a breakdown, a communication with the slave control devices 93 managed by that master control device 92 is disabled, and a battery charging/discharging control is also disabled even if the battery controlled by that master and slave control devices 92 and 93 is in a normal condition.

For example, in the example case shown in FIG. 9, when a fault occurs at the master control device 92 (92A), the slave control devices 93 ((1) to (8)) under the control of such a master control device become unable to control the battery since a communication is disabled between the master control device 92 and each slave control device 93.

The present invention has been made in view of such a circumstance, and it is an object of the present invention to provide a battery control system and a battery control method that can avoid uncontrollability of a battery by slave control devices when a master control device suffers a fault in a system which establishes a hierarchical structure of the master control system and the slave control systems and which transmits a control signal for controlling a battery.

SUMMARY OF THE INVENTION

To address the above-explained technical issue, a battery control system of the present invention causes a slave control device to refers to master-device line information when detecting a fault of a master control device, and obtains line information to establish a connection with the other master control device. Next, the slave control device transmits connection request information to the master control device extracted from the other master control devices. The other master control device determines whether or not a connection with the slave control device that has transmitted the connection request information is possible, and transmits a determination result as connectability information. The slave control device switches a communication line to the other master control device when the received connectability information indicates a connectable status.

DETAILED DESCRIPTION OF THE PREFERRED EMBODIMENT

<Process Outline>

First, an explanation will be given of a process outline executed by a 5 battery control system 1 according to an embodiment of the present invention.

Figure 1:
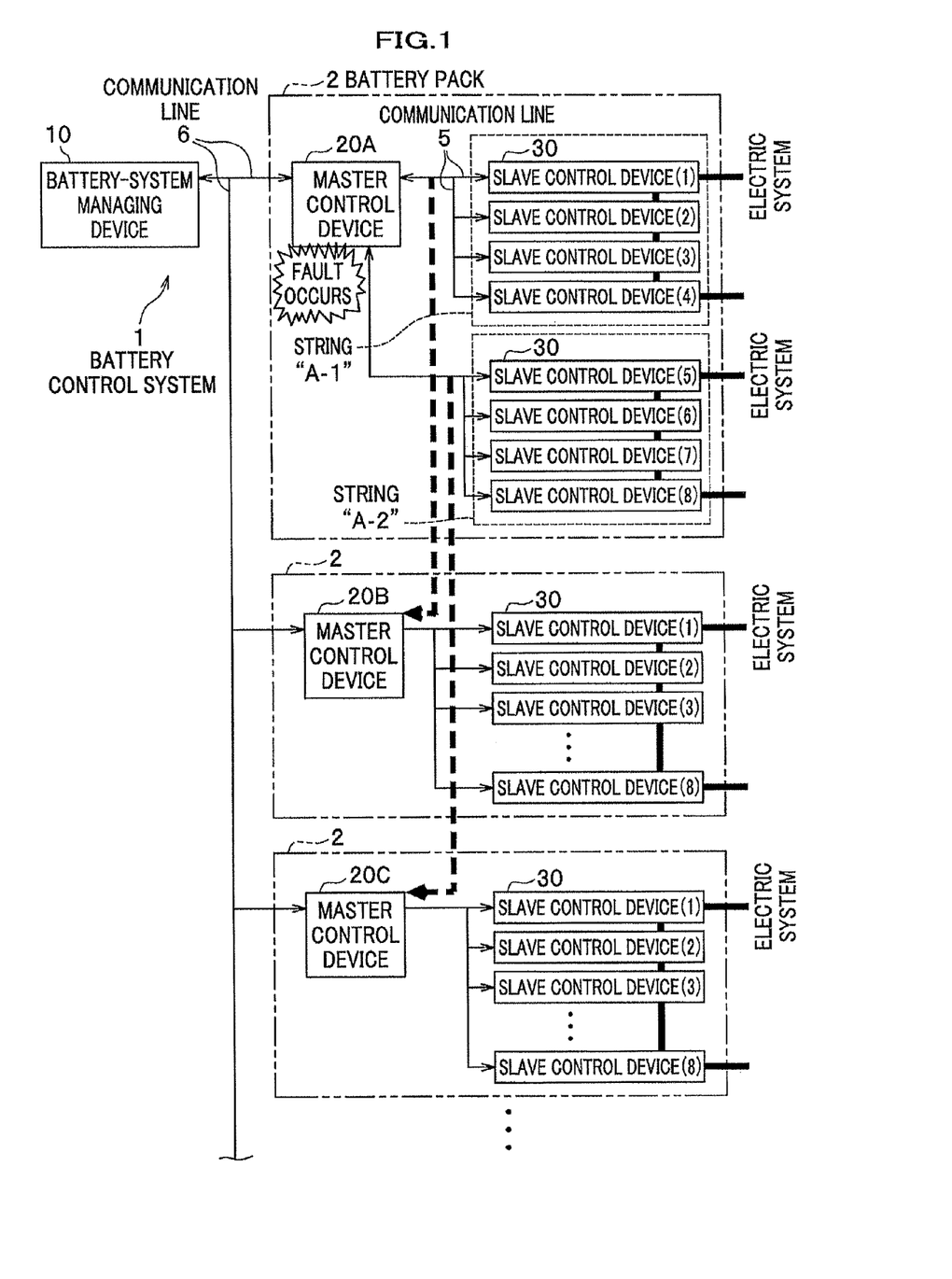
FIG. 1 is a diagram for explaining a process outline by a battery control system according to an embodiment of the present invention.

FIG. 1 is a diagram for explaining a process outline by the battery control system 1 according to the embodiment.

As shown in FIG. 1, the battery control system 1 of this embodiment includes a plurality of slave control devices 30 that control charging/discharging of a battery, a plurality of master control devices 20 (20A, 20B, 20C, etc.,) each connected to the plurality of slave control devices 30 via a communication line (a first communication line) 5, and configured to control the whole plural slave control devices 30 connected to the local master control device 20, and a battery-system managing device 10 which is connected to the plurality of master control devices 20 via a communication line (a second communication line) 6 and which controls the whole battery control system 1.

According to the prior art battery control system shown in FIG. 9, for example, a master control device 92A and slave control devices 93 that are the slave devices of the master control device are disposed as a battery pack 2 with a fixed communication line 5. Hence, when the master control device 92A suffers a fault, the slave control devices 93 ((1) to (8)) connected to the master control device 92A as slaves become unable to communicate, and thus a control of a battery, such as charging and discharging, is disabled.

According to the battery control system 1 of this embodiment, as shown in FIG. 1, when, for example, the master control device 20A suffers a fault, the slave control devices 30 that are the slave devices of the master control device 20A transmit a connection request (connection request information to be discussed later) to the other master control device 20 (e.g., master control devices 20B and 20C) other than the breakdown master control device 20A. Next, when the other master control device 20 (20B and 20C) is connectable, those slave control devices 30 switch the communication line (the first communication line) 5, and charge/discharge the battery under the control of the other master control device 20 (20B and 20C).

Moreover, the slave control device 30 switches of this embodiment, for each string indicating a configuration (a group) of series connection of a set electric system, a communication line to the other master control device 20 of the same string. An explanation will now be given of a string (a group of series connection) according to this embodiment.

Figure 2:
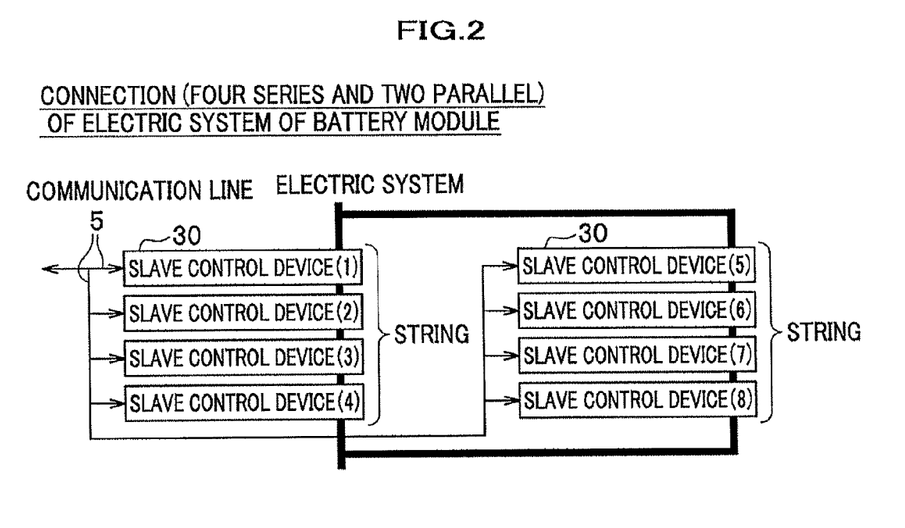
FIG. 2 is a diagram showing an example connection (four series and two parallel) of an electric system of a battery control module.

FIG. 2 is a diagram showing an example connection (four series and two parallel) of an electric system of a battery module.

In this embodiment, a battery module means a configuration including the slave control devices 30 and a battery controlled by the slave control devices 30. Illustration of the battery is omitted in FIGS. 2 to 4.

In FIG. 2, the slave control devices 30 (1) to (4) and 30 (5) to (8) are connected in series, respectively, and such two systems are connected in parallel. The slave control devices 30 (1) to (4) or (5) to (8) in series connection, respectively, are defined as a string (a group of series connection). The battery controlled by the slave control devices 30 (1) to (4) and the battery controlled by the slave control devices 30 (5) to (8) are connected in series, and groups of batteries in series connection are connected in parallel. The communication line 5 for transmitting/receiving control information, etc., with the master control device 20 is connected in parallel for each slave control device 30.

Figure 3:
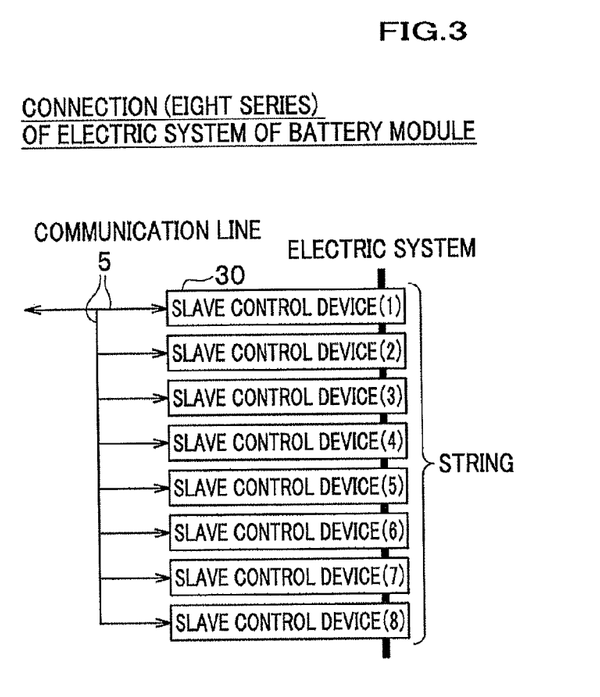
FIG. 3 is a diagram showing an example connection (eight series) of an electric system of a battery control module.

According to the example case shown in FIG. 3 (eight series), the slave control devices 30 (1) to (8) are connected in series, and configure a string. That is, batteries controlled by the slave control devices 30 (1) to (8) are connected in series.

Figure 4:
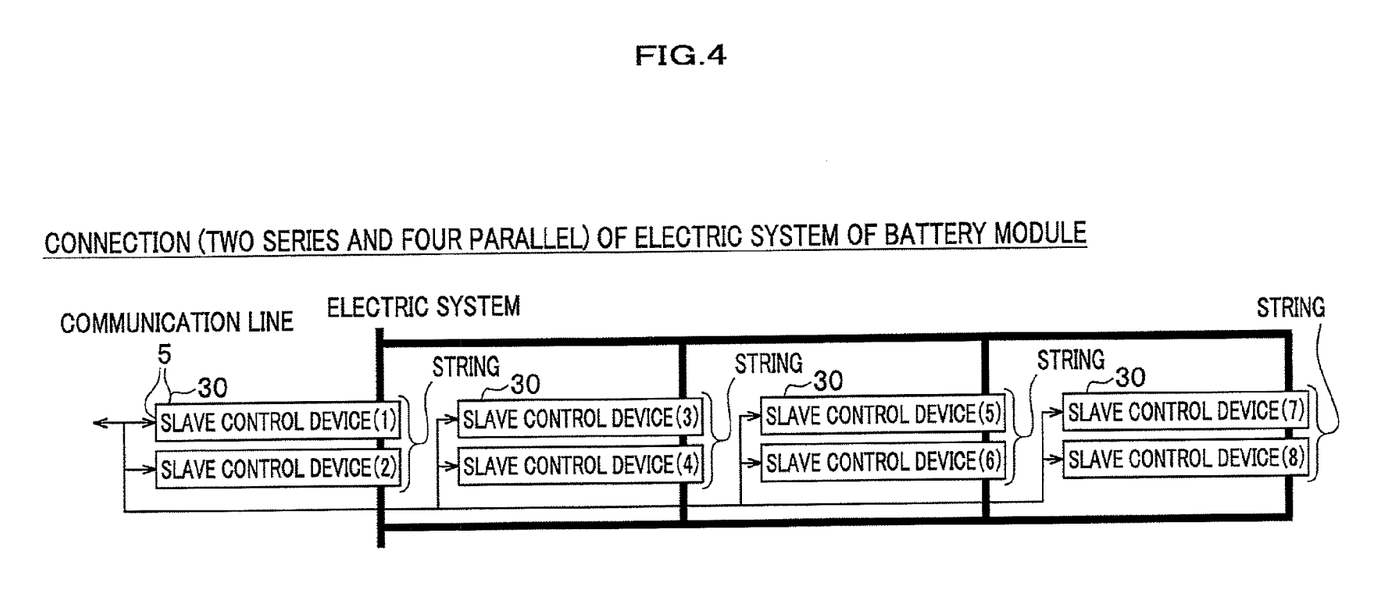
FIG. 4 is a diagram showing an example connection (two series and four parallel) of an electric system of a battery control module.

According to the example case shown in FIG. 4 (two series and four parallel), the slave control devices 30 (1) and (2), (3) and (4), (5) and (6), (7) and (8) are connected in series, respectively and each series connection configures a string. That is, batteries controlled by respective pairs of slave control devices 30 (1) and (2), (3) and (4), (5) and (6), (7) and (8) are connected in series, and groups of the batteries in series connection are connected in parallel.

The reason why such a string (a group of series connection) is introduced is if the slave control devices 30 belonging to the same string detect a fault of the master control device 20 connected to those slave control devices 30, and switch the line individually, those slave control devices 30 are connected to the other master control devices 20, respectively, and become uncontrollable. The introduction of the concept of string is to prevent such uncontrollability. For example, in FIG. 1, when the slave control device 30 (1) which is controlled by the master control device 20A having a fault and belonging to the same string, and which switches the communication line to be connected to the master control device 20B, and the slave control device 30 (2) belonging to the same string switches the communication line to be connected to the master control device 20C, separate instructions for charging and discharging are given from respective master control devices 20 (20B and 20C) to the batteries in a series connection at different timings, and the slave control devices 30 become uncontrollable.

The slave control device 30 of this embodiment stores in advance information on the local string, and transmits a connection request ("connection request information" to be discussed later) containing information on the local string to the other master control device 20. Accordingly, the slave control devices 30 belonging to the same string can switch the communication line to the same other master control device 20. That is, the slave control devices 30 can switch the communication line to the other master control device 20 while maintaining the string (the group of series connection). The detail of this operation will be explained later.

<System Configuration>

Next, a detailed explanation will be given of individual configurations of the slave control device 30, the master control device 20, and the battery-system managing device 10 configuring the battery control system 1 of this embodiment.

Figure 5:
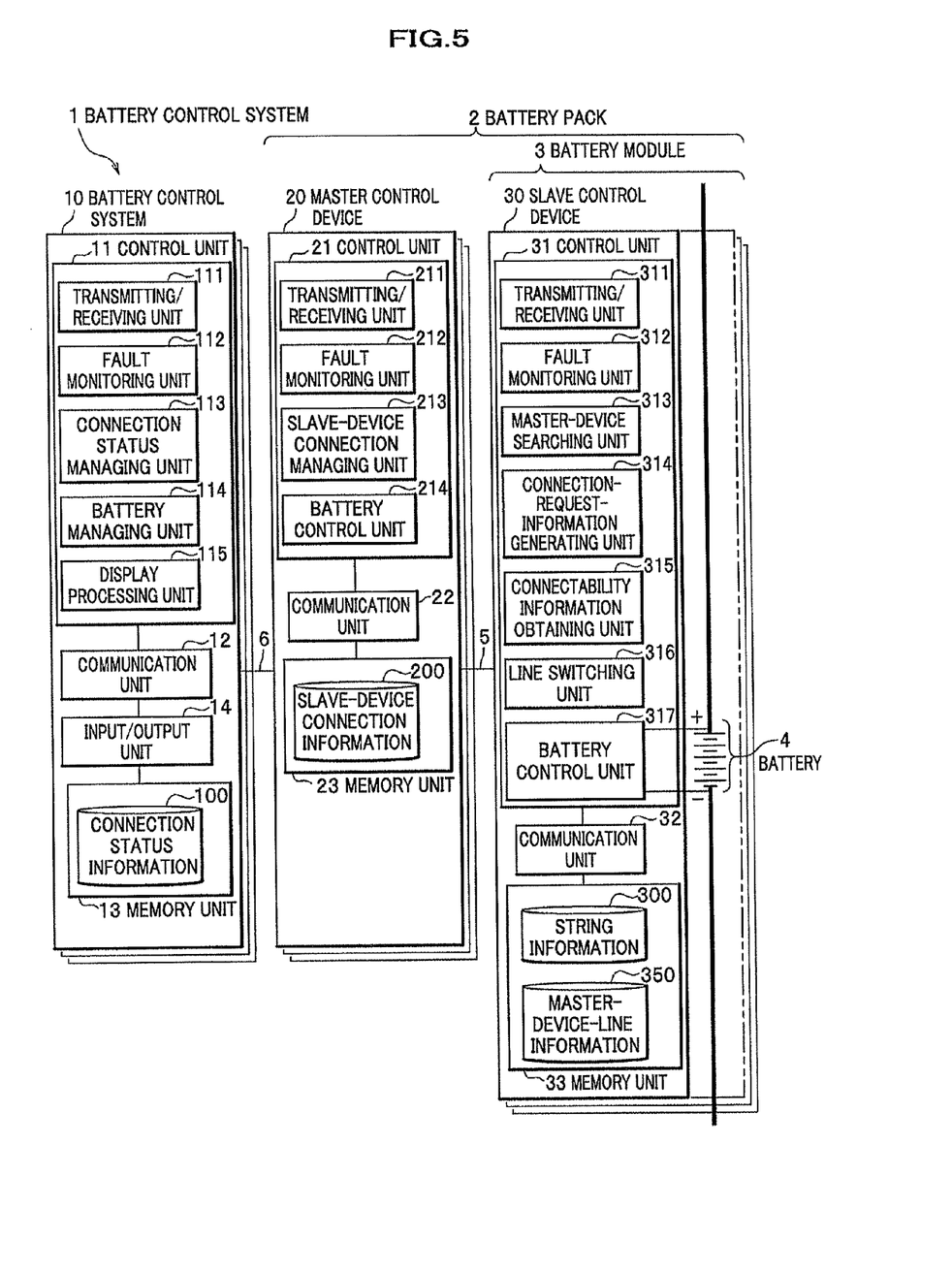
FIG. 5 is a functional block diagram showing example configurations of a slave control device, a master control device and a battery-system managing device in the battery control system according to the embodiment of the present invention.

FIG. 5 is a functional block diagram showing respective configurations of the slave control device 30, the master control device 20, and the battery-system managing device 10 of the battery control system 1 of this embodiment.

<Slave Control Device>

First, an explanation will be given of the detail of a configuration of the slave control device 30 according to this embodiment.

The slave control device 30 controls charging/discharging of a battery 4 under the control of the master control device 20. Moreover, the slave control device 30 executes a process of switching the communication line 5 to the other master control device 20 when the master control device 20 connected to this slave control device 30 suffers a fault like a breakdown.

As shown in FIG. 5, the slave control device 30 includes a control unit 31, a communication unit 32, and a memory unit 33.

The control unit 31 is responsible for the whole control of the slave control device 30 which performs processes of charging/discharging the battery 4 and switching a communication line to the other master control device 20, and includes a transmitting/receiving unit 311, a fault monitoring unit 312, a master-device searching unit 313, a connection-request-information generating unit 314, a connectability information obtaining unit 315, a line switching unit 316, and a battery control unit 317.

The transmitting/receiving unit 311 controls transmission/reception of information with the master control device 20 through the communication unit 32.

The fault monitoring unit 312 receives a connection check signal from the master control device 20 at a predetermined interval, and transmits a reply signal to the master control device 20, thereby periodically monitoring the communication line with the master control device 20.

When not receiving the connection check signal from the master control device 20 even if the predetermined interval has elapsed, the fault monitoring unit 312 detects a fault occurring on the master control device 20, and transmits information on that fault to the master-device searching unit 313.

Moreover, after detecting that the fault has occurred on the master control device 20, when receiving the connection check signal again from that master control device 20, the fault monitoring unit 312 determines that the master control device 20 is recovered from the fault, and transmits information on that recovery to the master-device searching unit 313.

The master-device searching unit 313 refers to string information 300 stored in the memory unit 33 when obtaining the information to the effect that the fault occurring on the master control device 20 is detected from the fault monitoring unit 312, and obtains information on the slave control devices 30 configuring the local string (the group of series connection).

Figure 6A:
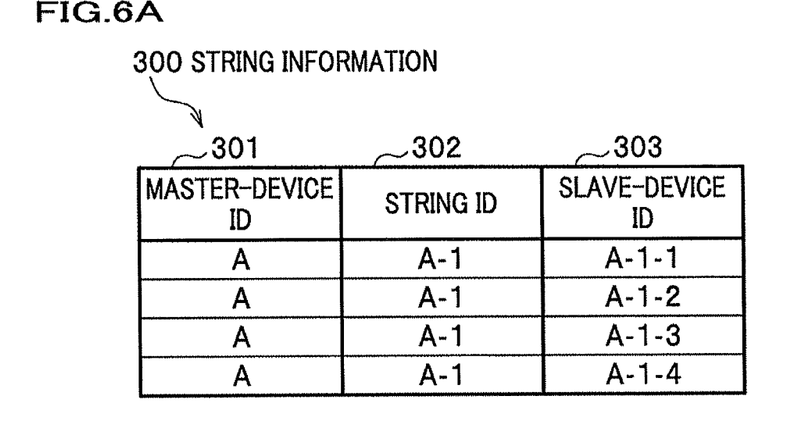
FIG. 6A is a diagram showing an illustrative data structure of string information according to the embodiment of the present invention.
Figure 6B:
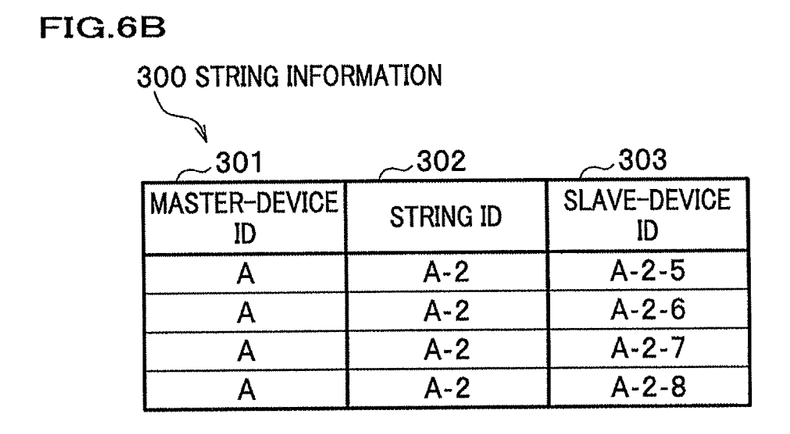
FIG. 6B is a diagram showing an illustrative data structure of string information according to the embodiment of the present invention.

FIGS. 6A and 6B are diagrams showing an illustrative data structure of the string information 300 according to this embodiment.

FIG. 6A shows the string information 300 stored in the memory unit 33 of the slave control device 30 belonging to a string "A-1" under the control of the master control device 20A in FIG. 1. Moreover, FIG. 6B shows the string information 300 stored in the memory unit 33 of the slave control device 30 belonging to a string "A-2" under the control of the master control device 20A in FIG. 1.

As shown in FIG. 6A, the string information 300 of this embodiment includes a master-device ID 301, a string ID 302, and a slave-device ID 303.

The master-device ID 301 is unique to the master control device 20 to which the slave control device 30 is currently connected. For example, the master-device ID 301 that is "A" of the master control device 20 is stored.

The string ID 302 is unique to the string (the group of series connection) to which the slave control device 30 belongs. For example, the string ID 302 that is "A-1" of the string connected to the master control device 20A is stored. The string ID "A-1" indicates that the string is set as the "first" string of the master control device 20A.

The slave-device ID 303 is unique to the slave control device 30, and for example, the slave-device ID 303 that is "A-1-1" is stored. The slave-device ID "A-1-1" indicates that, as an initial basic setting, this slave control device 30 is under the control of the master control device 20A, and is set as the "first" slave control device 30 among the slave control devices 30 with the string ID of "A-1".

The string information 300 shown in FIG. 6A includes four records, and indicates that the four slave control devices 30 belong to the string having the string ID 302 of "A-1".

Likewise, the string information 300 shown in FIG. 6B indicates that the four slave control devices 30 belong to the string having the string ID 302 of "A-2" and connected to the master control device 20A.

Returning to FIG. 5, the master-device searching unit 313 refers to the string information 300, and obtains the local slave-device ID 303 and information on the number of slave control devices 30 belonging to the local string.

Moreover, the master-device searching unit 313 refers to master-device-line information 350 stored in the memory unit 33, and determines whether or not line information (a frequency, a time slot, a phase, and a modulation scheme) necessary for a communication with each master control device 20 is stored.

Next, when the stored master-device-line information 350 contains the line information of the other master control device 20, the master-device searching unit 313 obtains the line information of the other master control device 20 from the master-device-line information 350.

Moreover, when the master-device-line information 350 stored in the memory unit 33 does not contain the line information of the other master control device 20, the master-device searching unit 313 calculates the line information of the other master control device based on the line information of the local master control device 20. For example, the master-device searching unit 313 calculates and obtains the line information of the other master control device 20 for each predetermined difference in frequency within a predetermined frequency range set in advance.

Next, the master-device searching unit 313 extracts a piece of line information among the pieces of obtained line information of the other master control devices 20, and passes the extracted line information of the other master control device 20, the local slave-device ID 303 obtained from the string information 300 and information on the number of slave control devices 30 in the local string to the connection-request-information generating unit 314 to execute a communication line switching process for switching the communication line 5 to the other master control device 20. The communication line switching process is a successive process executed by the master-device searching unit 313, the connection-request-information generating unit 314, the connectability information obtaining unit 315, and the line switching unit 316, and will be explained in more detail later with reference to FIG. 7.

Next, the connection-request-information generating unit 314 generates connection request information containing the local slave-device ID 303 obtained from the master-device searching unit 313 and the information on the number of slave control devices belonging to the local string. Thereafter, the connection request information is transmitted to the extracted other master control device 20 based on the line information of the other master control device 20 extracted by the master-device searching unit 313.

The connectability information obtaining unit 315 obtains connectability information from the other master control device 20 which has received the connection request information. The connectability information indicates whether or not the slave control devices 30 by what corresponds to the number thereof configuring the local string are connectable to the other master control device 20, and is added with information "connectable" or "unconnectable".

When the information added to the connectability information is "connectable", the connectability information obtaining unit 315 passes such information to the line switching unit 316.

Conversely, when the information added to the connectability information is "unconnectable", the connectability information obtaining unit 315 passes such information to the master-device searching unit 313.

The line switching unit 316 switches the communication line 5 to the other master control device 20 which has transmitted the connectability information of "connectable" when obtaining the information of "connectable" from the connectability information obtaining unit 315.

Moreover, the line switching unit 316 switches the communication line 5 to the original master control device 20 when obtaining information to the effect that the original master control device 20 is recovered from the fault from the fault monitoring unit 312.

The battery control unit 317 receives a battery control signal from the battery-system managing device 10 via the master control device 20, and controls charging/discharging of the battery 4 connected to the battery control unit 317.

The communication unit 32 includes a communication interface for transmitting and receiving information with each master control device 20.

The memory unit 33 includes memory means, such as a flash memory or a RAM (Random Access Memory), and stores the string information 300, the master-device-line information 350, etc.

The function of the control unit 31 of the slave control device 30 is realized by, for example, a CPU (Central Processing Unit) which extracts in a memory like a RAM a program stored in the memory unit 33 of the slave control device 30 and runs such a program, or an exclusive circuit, etc.

<Master Control Device>

Next, a detailed explanation will be given of a configuration of the master control device 20 according to this embodiment.

The master control device 20 is connected to the battery-system managing device 10 and individual local slave control devices 30, and transmits control information from the battery-system managing device 10 to each slave control device 30.

As shown in FIG. 5, the master control device 20 includes a control unit 21, a communication unit 22, and a memory unit 23.

The control unit 21 is responsible for the control of the whole master control device 20, and includes a transmitting/receiving unit 211, a fault monitoring unit 212, a slave-device connection managing unit 213, and a battery control unit 214.

The transmitting/receiving unit 211 controls transmission and reception of information with the battery-system managing device 10 and each slave control device 30 via the communication unit 22.

The fault monitoring unit 212 receives a connection check signal from the battery-system managing device 10 at a predetermined interval, and transmits a reply signal to the battery-system managing device 10, thereby periodically monitoring the communication line with the battery-system managing device 10. Moreover, the fault monitoring unit 212 transmits a connection check signal to each slave control device 30 at a predetermined interval, and receives a reply signal from each slave control device 30, thereby periodically monitoring the communication line with each slave control device 30.

The slave-device connection managing unit 213 executes a following process when receiving the connection request signal from the slave-control device 30 under the control of the other master control device 20 than the local master control device 20 via the transmitting/receiving unit 211. That is, the slave-device connection managing unit 213 determines whether or not the local master control device 20 is connectable as the other master control device 20 to the slave control devices 30 by what corresponds to the number of slave control devices 30 belonging to the string where the slave control device 30 which has requested a connection belongs based on the information which is added with the connection request signal and which is on the number of the slave devices 30 belonging to the string where the slave control device 30 that has requested a connection belongs.

The determination by the slave-device connection managing unit 213 for the connectability can be made based on a determination on whether or not the transmission channels within the frequency range set for the master control device 20 have unused channels by what corresponds to the number of slave control devices 30 belonging to the string where the slave control device 30 which has requested a connection belongs when, for example, transmission is carried out through a frequency division multiplex scheme over the communication line 5, and whether or not time slots have unused time slots by what corresponds to the number of such slave control devices 30 belonging to the string when transmission is carried out through a time division multiplex scheme, etc.

When determining that the slave control devices 30 by what corresponds to the number of slave control devices 30 belonging to the string are connectable, the slave-device connection managing unit 213 replies the connectability information added with the information "connectable" to the slave control device 30 that has transmitted the connection request information.

Conversely, when determining that it is unconnectable, the slave-device connection managing unit 213 replies the connectability information added with the information "unconnectable" to the slave control device 30 that has transmitted the connection request information.

The slave-device connection managing unit 213 receives the same connectability information from the slave control devices 30 belonging to the same string by what corresponds to the number of such slave control devices 30, but transmits the same determination result on the determination of "connectable" or "unconnectable" as the connectability information to each slave control device 30.

Moreover, when each slave control device 30 which has received the connectability information added with the information "connectable" switches the communication line, the slave-device connection managing unit 213 generates slave-device connection information 200 indicating that this slave control device 30 is connected to the local master control device 20, and stores the generated information in the memory unit 23. Furthermore, the slave-device connection managing unit 213 transmits the generated slave-device connection information 200 to the battery-system managing device 10 via the transmitting/receiving unit 211.

The battery control unit 214 transmits battery control information received from the battery-system managing device 10 to the slave control device 30 connected to the local master control device 20.

The communication unit 22 includes a communication interface for transmitting and receiving information with each slave control device 30 and the battery-system managing device 10.

The memory unit 23 includes memory means, such as a flash memory or a RAM, and stores the slave-device connection information 200, etc., indicating each slave control device 30 connected to the local master control device 20.

The function of the control unit 21 of the master control device 20 is realized by, for example, a CPU (Central Processing Unit) which extracts in a memory like a RAM a program stored in the memory unit 23 of the master control device 20 and runs such a program, or an exclusive circuit, etc.

<Battery-System Managing Device>

Next, a configuration of the battery-system managing device 10 of this embodiment will be explained in detail.

The battery-system managing device 10 is connected to each master control device 20, and transmits battery control information, etc., to the slave control devices 30 under the control of each master control device 20.

As shown in FIG. 5, the battery-system managing device 10 includes a control unit 11, a communication unit 12, a memory unit 13, and an input/output unit 14.

The communication unit 12 includes a communication interface for transmitting and receiving information with each master control device 20.

The memory unit 13 includes memory means, such as a hard disk, a flash memory, or a RAM, and stores connection status information 100 indicating to which slave control devices 30 each master control device 20 connected to the battery-system managing device 10 is connected, etc.

The input/output unit 14 includes an input device (unillustrated), such as a keyboard or a mouse, an output device (unillustrated) like a display, and an input/output interface for exchanging information with those devices.

The control unit 11 is responsible for the control of the whole battery-system managing device 10, and includes a transmitting/receiving unit 111, a fault monitoring unit 112, a connection status managing unit 113, a battery managing unit 114, and a display processing unit 115.

The transmitting/receiving unit 111 controls transmission and reception of information with each master control device 20 via the communication unit 12.

The fault monitoring unit 112 transmits the connection check signal to each master control device 20 at a predetermined interval, and receives the reply signal from each master control device 20, thereby periodically monitoring the communication line with each master control device 20.

When not receiving the reply signal from the master control device 20 even if a predetermined interval has elapsed, the fault monitoring unit 112 detects the fault occurring on the master control device 20, and passes information on that fault to the display processing unit 115.

Moreover, after detecting the fault occurring on the master control device 20, when receiving the reply signal from that master control device 20 again, the fault monitoring unit 112 determines that the master control device 20 is recovered from the fault, and passes information on that recovery to the display processing unit 115.

The connection status managing unit 113 receives, from each master control device 20, the slave-device connection information 200 indicating the slave control devices 30 connected to that master control device 20, and updates the connection status information 100 stored in the memory unit 13.

Moreover, the connection status managing unit 113 passes the slave-device connection information 200 to the display processing unit 115 when receiving such information from each master control device 20.

The battery managing unit 114 refers to the connection status information 100 stored in the memory unit 13, and transmits battery control information, etc., to the slave control devices 30 under the control of each master control device 20.

The display processing unit 115 causes the unillustrated display device to display fault information indicating the fault master control device 20 and obtained from the fault monitoring unit 112 and fault recovery information. Moreover, the display processing unit 115 causes the unillustrated display device to display information on the slave control devices 30 connected to each master control device 20 based on the slave-device connection information 200 received from the connection status managing unit 113.

<Process Detail>

Next, a detailed explanation will be given of a communication-line switching process executed by the slave control device 30 according to this embodiment. Thereafter, the flow of the whole process by the battery control system 1 of this embodiment will be explained.

<Communication-line Switching Process>

Figure 7:
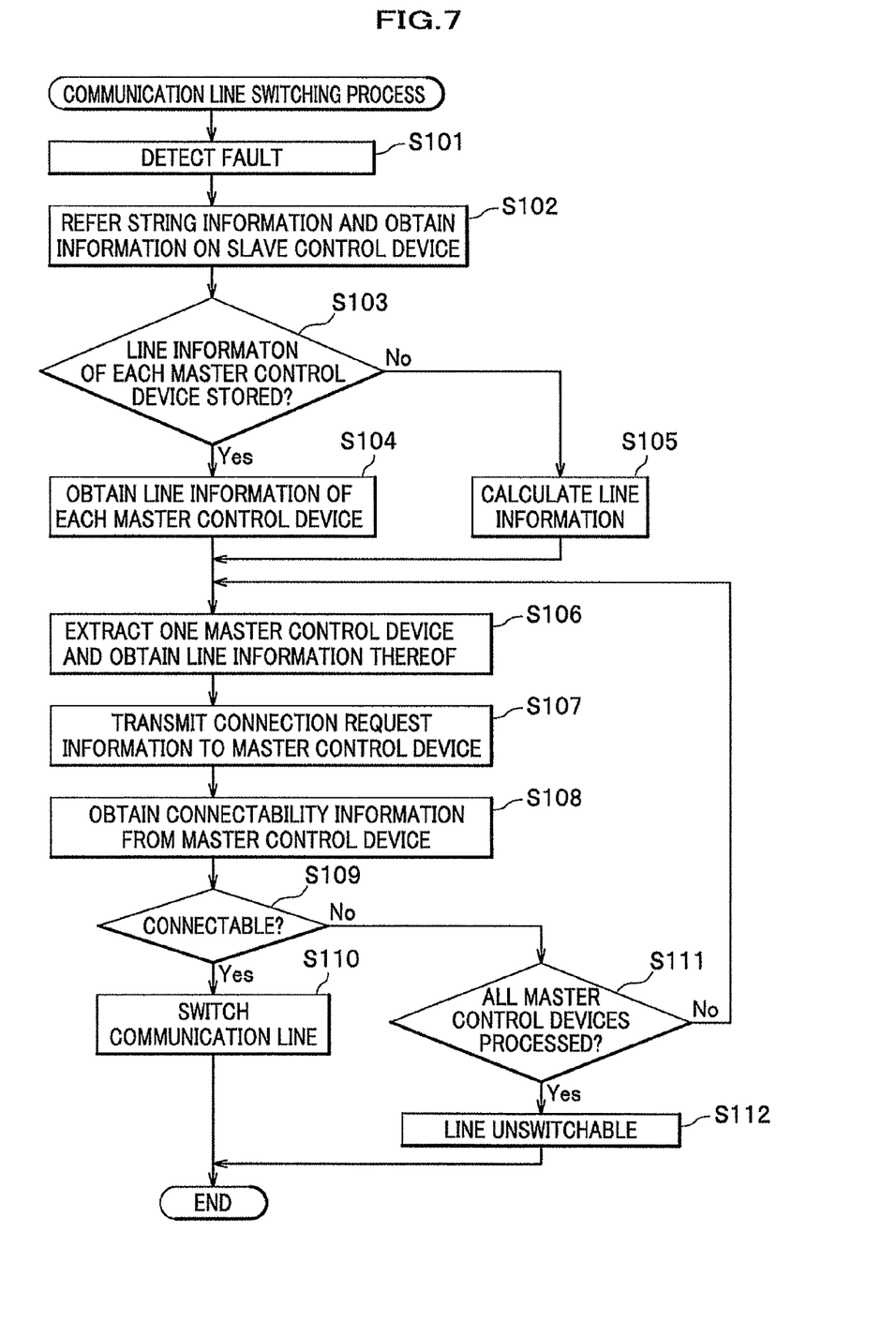
FIG. 7 is a flowchart showing a flow of a communication-line switching process executed by the slave control device according to the embodiment of the present invention.

FIG. 7 is a flowchart showing a flow of the communication-line switching process executed by the slave control device 30 of this embodiment. The communication-line switching process causes the slave control device 30 to switch the communication line to the other master control device 20 when the master control device 20 becomes uncommunicatable due to a fault like a breakdown. It is presumed that, as shown in FIG. 1, the master control device 20A suffers a fault like a breakdown. The master control device 20A controls the slave control devices 30 ((1) to (8)) of the electric system in the four series and two parallel connection as shown in FIG. 2, and as shown in FIG. 1, the slave control devices 30 ((1) to (4)) belong to the string "A-1", and the slave control devices 30 ((5) to (8)) belong to the string "A-2".

First, the fault monitoring unit 312 of the slave control device 30 detects, upon checking of no check signal after the predetermined interval has elapsed with the master control device 20, that the master control device 20 is suffering a fault (step S101).

Next, the master-device searching unit 313 of the slave control device 30 refers to the string information 300 stored in the memory unit 33, and obtains information on the slave control devices 30 configuring the string where the local slave control device 30 belongs (step S102). In this step, the master-device searching unit 313 obtains, from the string information 300, the slave-device ID 303 of the local device that is "A-1-1", and information to the effect that the number of slave control devices 30 belonging to the same string is four (see FIG. 6A).

Subsequently, the master-device searching unit 313 refers to the master-device-line information 350 stored in the memory unit 33, and determines whether or not line information (frequency, time slot, phase, and modulation scheme) necessary to communication with the other master control device 20 is stored (step S103).

When the master-device-line information 350 is recorded with the necessary line information to communicate with the other master control device 20 (step S103: YES), the master-device searching unit 313 obtains the line information for the other master control device 20 from the master-device-line information 350 (step S104), and the process progresses to next step S106.

Conversely, when the master-device-line information 350 is not recorded with such necessary line information to communicate with the other master control device 20 (step S103: NO), the master-device searching unit 313 calculates the line information of the other master control device 20 (step S105), and the process progresses to the next step S106. The calculation of the line information of the other master control device 20 by the master-device searching unit 313 is carried out by, for example, calculating the line information of each master control device 20 based on a predetermined difference in frequency stored in advance in the memory unit 23 and within a frequency range used to communicate with the master control device 20.

Next, in the step S106, the master-device searching unit 313 extracts one of the other master control devices 20 than the local master control device 20, and obtains the line information of the extracted master control device 20.

Regarding the extraction of the other master control device 20 by the master-device searching unit 313, the same logic is applied to each of the slave control devices 30 (four devices) belonging to the same string shown in FIG. 1 and one of the other master control devices 20 is extracted in the same order. Moreover, the way of extracting the master control device 20 by the master-device searching unit 313 may employ, for example, a logic of extracting the other master control device 20 in the order of closer frequency to that of the master control device 20 that has been connected before. Hence, the master-device searching units 313 of the slave control devices 30 (four devices) belonging to the same string do not separately extract the different master control devices 20, but extract the same master control device 20 in accordance with the same logic.

Subsequently, the connection-request-information generating unit 314 of the slave control device 30 generates the connection request information including the slave-device ID 303 (A-1-1) of the local slave device 30 obtained in the step S102, and the information on the number of slave control devices 30 (four devices) configuring the local string (A-1). Thereafter, the connection-request-information generating unit 314 transmits the generated connection request information to the other master control device 20 (e.g., the master control device 20B) based on the line information of the other master control device 20 obtained in the step S106 (step S107).

The connectability information obtaining unit 315 of the slave control device 30 obtains the connectability information added with information on whether or not the master control device 20 is connectable from the master control device 20 which has transmitted the connection request information in the step S107 (step S108), and checks whether or not it is connectable (step S109).

When the information added to the connectability information indicates a connectable status (step S109: YES), the connectability information obtaining unit 315 passes such information to the line switching unit 316, and the line switching unit 316 switches the communication line for a battery control to the connectable master control device 20 (step S110).

Conversely, when the information added to the connectability information indicates an unconnectable status (step S109: NO), the connectability information obtaining unit 315 passes such information to the master-device searching unit 313, and the master-device searching unit 313 determines whether or not all pieces of line information of the other master control devices 20 are processed (step S111).

The determination by the slave-device connection managing unit 213 of the master control device 20 on whether or not it is connectable is to determine whether or not the slave control devices 30 by what corresponds to the number thereof in the string are connectable. Accordingly, the pieces of connectability information from the slave control devices 30 (four devices) belonging to the same string are added with the same determination result "connectable" or "unconnectable". Moreover, when the slave-device connection managing unit 213 is configured to determine whether or not the slave control device 30 belonging to a string is connectable for the pieces of connection request information from the slave control devices 30 (four devices) belonging to the same string, the further determination for the pieces of connection request information from the slave control devices 30 (the remaining three devices) belonging to the same string is unnecessary, and it is fine if the connectability information generated using the determination result of the first process is transmitted.

When there is the line information of the other master control device 20 not processed yet (step S111: NO), the process returns to the step S106, and the master-device searching unit 313 extracts the next master control device 20.

Conversely, when determining that all pieces of line information of the other master control devices 20 are processed (step S111: YES), the master-device searching unit 313 determines that the line switching is unavailable, and terminates the process (step S112).

In the example case shown in FIG. 1, as a result of the communication line switching process, the four slave control devices 30 ((1) to (4)) belonging to the string "A-1" switch the communication line 5 to the master control device 20B, and the four slave control devices 30 ((5) to (8)) belonging to the string "A-2" switch the communication line 5 to the master control device 20C.

According to such a process, each slave control device 30 can switch the communication line to the other master control device 20 while maintaining the string (the group of series connection).

<Whole Process by Battery Control System>

Next, an explanation will be given of a flow of the whole process by the battery control system 1 of this embodiment.

Figure 8:
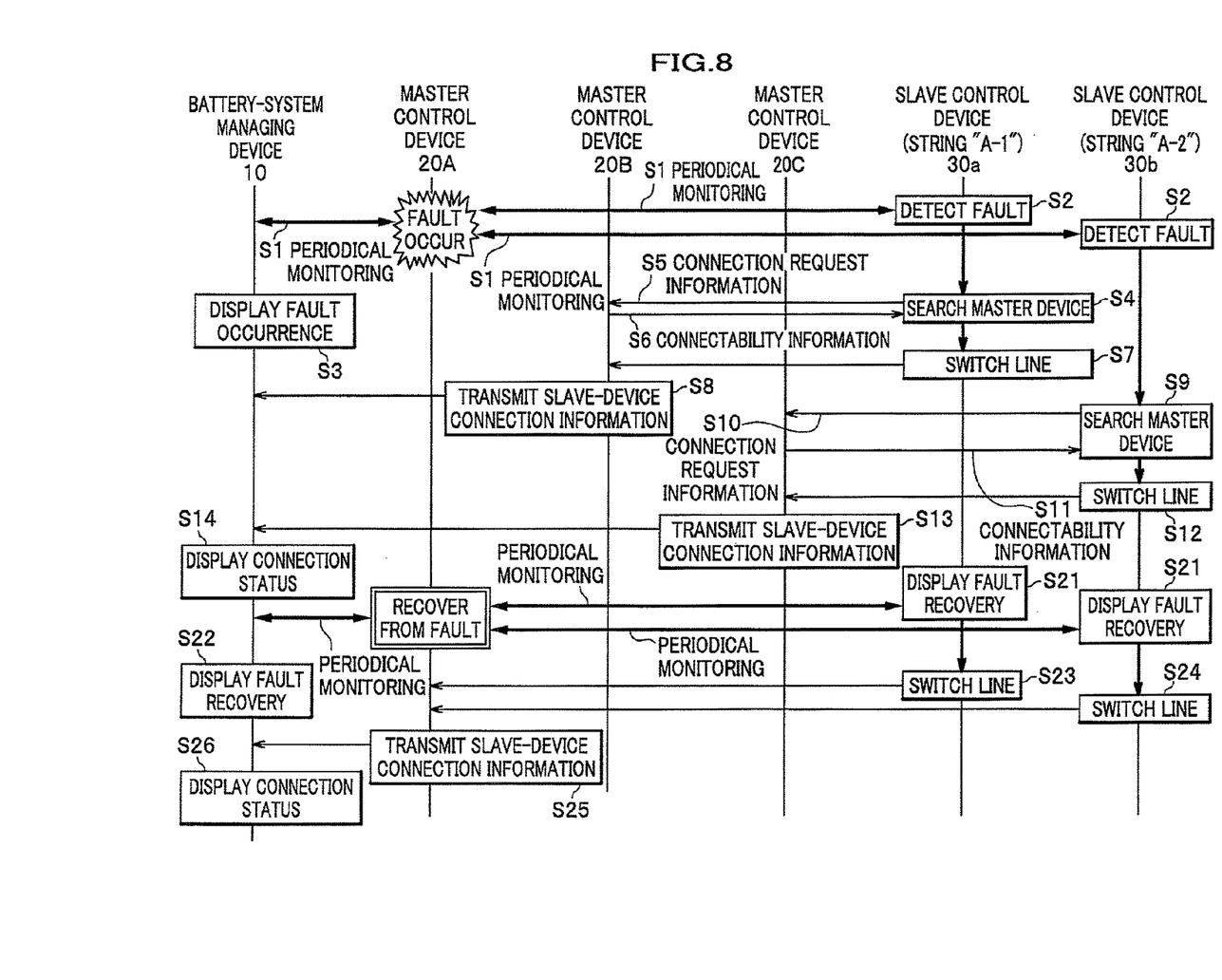
FIG. 8 is a sequence diagram showing a whole process flow by the battery control system according to the embodiment of the present invention.

FIG. 8 is a sequence diagram showing a flow of the whole process by the battery control system 1 according to this embodiment.

It is presumed that as shown in FIG. 1 the master control device 20 (20A) suffers a fault like a breakdown, the slave control devices 30 (hereinafter, referred to as "slave control devices 30a") belonging to the string "A-1" under the control of the master control device 20A and the slave control devices 30 (hereinafter, referred to as "slave control devices 30b") belonging to the string "A-2" also under the control of the master control device 20A perform line switching to be connected to the other master control devices 20 (20B and 20C), respectively.

First, periodical monitoring is performed between the master control device 20A and the slave control device 30a and the slave control device 30b under the control of such master control device 20A, and between the master control device 20A and the battery-system managing device 10 (step S1). The four slave control devices 30a and the four slave control devices 30b shown in FIG. 1 respectively perform periodical monitoring with the master control device 20A. The processes executed by the slave control device 30a and the slave control device 30b and explained below are executed by respective four devices.

Respective fault monitoring units 312 of the slave control devices 30a and 30b detect that the master control device 20A is suffering a fault like a breakdown since, for example, no connection check signal from the master control device 20A is confirmed even after the predetermined interval (step S2: detect fault).

Moreover, the battery-system managing device 10 (the fault monitoring unit 122) detects that the master control device 20A is suffering a fault since, for example, no reply signal to the connection check signal transmitted by battery-system managing device 10 to the master control device 20A is confirmed even after the predetermined interval, and displays information on the fault detection on the display device (unillustrated) through the display processing unit 115 (step S3: display fault occurrence).

The slave control device 30a that has detected the fault executes the communication-line switching process (see FIG. 7). The slave control device 30a searches the other master control device 20 (step S4), and transmits the connection request information to the searched master control device 20B (step S5). The master control device 20B determines that the four slave control devices 30 belonging to the string "A-1" (see FIG. 6A) are connectable, and transmits the connectability information indicating the determination result "connectable" to the slave control device 30a (step S6). Next, the slave control device 30a switches the communication line for battery control from the master control device 20A to the master control device 20B (step S7). Next, the master control device 20B transmits the slave-device connection information 200 to the effect that the communication line is established with the slave control devices 30a (the four devices) belonging to the string "A-1" to the battery-system managing device 10 (step S8).

The slave control device 30b also detecting the fault executes the same process as that of the slave control device 30a (steps S4 to S8) with the master control device 20C extracted from the other master control devices 20 (steps S9 to S13).

The battery-system managing device 10 that has received respective slave-device connection information 200 from the master control device 20B and the master control device 20C causes the display device to display information to the effect that the group of slave control devices 30 belonging to the string "A-1" and the group of slave control devices 30 belonging to the string "A-2" are connected to the master control device 20B and the master control device 20C, respectively (step S14: display connection status).

Next, when the master control device 20A suffering a fault is recovered from such a fault by repair, replacement, etc., respective fault monitoring units 312 of the slave control devices 30a and 30b detect that the master control device 20A is recovered from the fault by, for example, receiving the connection check signal from the master control device 20A (step S21: detect fault recovery).

Moreover, the battery-system managing device 10 (the fault monitoring unit 122) detects that the master control device 20A is recovered from the fault by, for example, receiving the reply signal to the connection check signal transmitted by the battery-system managing device 10 to the master control device 20A within a predetermined interval, and causes the display device to display information on the recovery from the fault through the display processing unit 115 (step S22: display fault recovery).

Next, the slave control device 30a that has detected the recovery of the master control device 20A from the fault switches the communication line for a battery control from the master control device 20B to the master control device 20A (step S23). Moreover, the slave control device 30b that has detected the recovery of the master control device 20A from the fault switches the communication line for a battery control from the master control device 20C to the master control device 20A (step S24).

Subsequently, the master control device 20A transmits the slave-device connection information 200 to the effect that the communication lines are established with the group of slave control devices 30 belonging to the string "A-1" and the group of slave control devices 30 belonging to the string "A-2" to the battery-system managing device 10 (step S25).

Next, the battery-system managing device 10 that has received the slave-device connection information 200 from the master control device 20A causes the display device to display information to the effect that the master control device 20A is recovered from the fault and the communication line is returned to the original connection (step S26: display connection status).

As explained above, according to the battery control system 1 and the battery control method according to this embodiment, even if the master control device 20 suffers a fault, the slave control device 30 under the control of that master control device 20 can switch the line to the other master control device 20 while maintaining the string (the group of series connection) where the local slave control device 30 belongs. Accordingly, it becomes possible to avoid uncontrollability of the battery controlled by the slave control device 30 under the control of the master control device 20 suffering a fault.

The distributed processing of the battery control employed by the battery control system 1 and the battery control method of this embodiment is advantageous when the number of batteries is large, and is especially advantages for the battery management of a natural energy power generating system in a mega-watt class.

What is claimed is:

1. A battery control system comprising:
a plurality of slave control devices each controlling charging/discharging of a battery; and
a plurality of master control device connected to each of the plurality of slave control devices via a first communication line and controlling the plurality of slave control devices connected to respective master control devices,
the slave control device comprising:
    a memory unit that stores master-device-line information containing line information to communicate with each of the plurality of master control devices;
    a fault monitoring unit that detects a fault of the master control device connected to the local slave control device;
    a master-device searching unit that searches the line information of an other master control device than the master control device connected to the local slave control device from the master-device-line information when the fault is detected;
    a connection-request-information generating unit which generates connection request information indicating a connection request with the other master control device and which transmits the generated connection request information to the other master control device;
    a connectability information obtaining unit that obtains, from the other master control device, connectability information indicating whether or not connection with the slave control device is possible; and
    a line switching unit that switches the first communication line from the master control device connected to the local slave control device to the other master control device when the connectability information indicates that a connection with the slave control device is possible,
the master control device comprising:
    a slave-device connection managing unit which receives the connection request information, determines whether or not a connection with the slave control device is possible, generates the connectability information indicating a determination result, and transmits the connectability information to the slave control device.

2. The battery control system according to claim 1, wherein in the slave control device,
    the memory unit further stores string information indicating that the battery controlled by the slave control device and the battery controlled by another slave control device is connected in series, and also indicating a group of slave control devices controlling respective batteries connected in series,
    the master-device searching unit refers to the string information, and obtains a number of slave control devices controlling the batteries connected in series, and
    the connection-request-information generating unit generates the connection request information added with information on the number of slave control devices controlling the batteries connected in series,
in the master control device, the slave-device connection managing unit generates, when receiving from the slave control device the connection request information added with the information on the number of slave control devices controlling the batteries connected in series, the connectability information indicating that a connection with the slave control device is possible if the connection is possible with the slave control devices by what corresponds to the number of slave control devices.

3. The battery control system according to claim 1, wherein when the master-device-line information in the memory unit does not contain the line information of each of the plurality of master control devices, the master-device searching unit of the slave control device calculates, based on the line information of the master control device connected to the local slave control device, line information of the other master control device in accordance with a predetermined difference from the line information.

4. The battery control system according to claim 1, wherein when the fault monitoring unit of the slave control device detects a recovery of the master control device connected to the local slave control device from a fault, the line switching unit switches the first communication line from the other master control device to the master control device originally connected to the slave control device.

5. The battery control system according to claim 1, further comprising a battery-system managing device which is connected to each of the plurality of master control devices via a second communication line, and which transmits a control signal for the battery to the slave control device through the master control device, wherein
   the slave-device connection managing unit of the other master control device generates slave-device connection information indicating a connection between the newly connected slave control device with the other master control device when the first communication line is switched from the master control device connected to the local slave control device to the other master control device, and transmits the generated slave-device connection information to the battery-system managing device, and
   the battery-system managing device receives the slave-device connection information from the other master control device, and causes a display device to display the received slave-device connection information.

6. A battery control method executed by a battery control system that comprises:

a plurality of slave control devices each controlling charging/discharging of a battery; and
a plurality of master control device connected to each of the plurality of slave control devices via a first communication line and controlling the plurality of slave control devices connected to respective master control devices,
the slave control device comprising a memory unit that stores master-device-line information containing line information to communicate with each of the plurality of master control devices,
the slave control device executing steps of:
   detecting a fault of the master control device connected to the local slave control device;
   searching the line information of an other master control device than the master control device connected to the local slave control device from the master-device-line information when the fault is detected; and
   generating connection request information indicating a connection request with the other master control device and transmitting the generated connection request information to the other master control device,
the other master control device executing a step of
receiving the connection request information, determining whether or not a connection with the slave control device is possible, generates the connectability information indicating a determination result, and transmitting the generated connectability information to the slave control device, and
the slave device executing steps of:
obtaining the connectability information from the other master control device; and
switching the first communication line from the master control device connected to the local slave control device to the other master control device when the connectability information indicates that a connection with the slave control device is possible.

* * * * *